US007307542B1

(12) United States Patent
Chandler et al.

(10) Patent No.: US 7,307,542 B1
(45) Date of Patent: Dec. 11, 2007

(54) SYSTEM AND METHOD FOR COMMISSIONING ADDRESSABLE LIGHTING SYSTEMS

(75) Inventors: Scott S. Chandler, Payson, UT (US); Daniel Patten, Pleasant Grove, UT (US); Paul T. Clegg, Lindon, UT (US); Peter L. Taylor, Orem, UT (US)

(73) Assignee: Vantage Controls, Inc., Orem, UT (US)

( * ) Notice: Subject to any disclaimer, the term of this patent is extended or adjusted under 35 U.S.C. 154(b) by 254 days.

(21) Appl. No.: 10/934,777

(22) Filed: Sep. 3, 2004

Related U.S. Application Data

(60) Provisional application No. 60/500,193, filed on Sep. 3, 2003.

(51) Int. Cl.
*H04Q 5/22* (2006.01)

(52) U.S. Cl. ........................... 340/825.52; 340/825.53; 340/825.72; 710/105; 710/104; 710/305

(58) Field of Classification Search ........... 340/825.52, 340/825.53, 825.72, 825.71, 825.4; 710/8–11, 710/104–106, 305, 306, 314, 315; 315/316–317, 315/322–324, 929
See application file for complete search history.

(56) References Cited

U.S. PATENT DOCUMENTS

| | | | |
|---|---|---|---|
| 2,482,773 | A | 9/1949 | Hieronymus |
| D163,736 | S | 6/1951 | Bangert, Jr. |
| 2,828,413 | A | 3/1958 | Bowers et al. |
| 2,853,585 | A | 9/1958 | Danziger et al. |
| 3,284,667 | A | 11/1966 | Harris et al. |
| 3,491,249 | A | 1/1970 | Rabinow |
| 3,579,030 | A | 5/1971 | Bentham et al. |
| 3,689,886 | A | 9/1972 | Durkee |
| 3,697,821 | A | 10/1972 | Johnson |
| 3,706,914 | A | 12/1972 | Van Buren |
| 3,707,682 | A | 12/1972 | Harris |
| 3,736,591 | A | 5/1973 | Rennels et al. |

(Continued)

FOREIGN PATENT DOCUMENTS

| | | |
|---|---|---|
| CA | 2 245 671 | 9/2003 |

(Continued)

OTHER PUBLICATIONS

ADEMCO, "No. 5827BD Wireless Bidirectional Console used with 5800TH Transmitter Module Installation Instructions and Operating Guide," Aug. 1993.

(Continued)

*Primary Examiner*—Tuyet Vo
(74) *Attorney, Agent, or Firm*—McCarter & English, LLP

(57) ABSTRACT

A system for commissioning ballasts comprising a wireless device that can be easily transported to any location served by an addressable lighting system. The wireless device allows a user to cycle through a list of uncommissioned ballasts and send a command to a control system to flash the lights connected to each of the ballasts on the list one by one. When a light is observed to flash by the user, the user of the wireless device may then commission the correct ballast with the wireless device. In addition, the user may assign the ballast to a group. In this way, the commissioning of ballasts in, for example, a building is greatly facilitated.

7 Claims, 3 Drawing Sheets

U.S. PATENT DOCUMENTS 3,746,923 A 7/1973 Spira et al.
3,763,394 A 10/1973 Blanchard
3,784,875 A 1/1974 Baker et al.
3,867,596 A 2/1975 Schadow
3,868,546 A 2/1975 Gilbreath et al.
3,868,547 A 2/1975 Kappenhagen et al.
3,885,116 A 5/1975 Kodaira
3,918,062 A 11/1975 Haruki et al.
3,940,660 A 2/1976 Edwards
3,980,954 A 9/1976 Whyte
3,986,423 A 10/1976 Rossum
3,996,441 A 12/1976 Ohashi
4,016,561 A 4/1977 Parker et al.
4,057,751 A 11/1977 Bonsignore et al.
4,060,735 A 11/1977 Pascucci et al.
4,095,139 A 6/1978 Symonds et al.
D249,141 S 8/1978 Mayo
4,123,756 A 10/1978 Nagata et al.
4,131,777 A 12/1978 Bailey et al.
4,156,866 A 5/1979 Miller
4,163,218 A 7/1979 Wu
4,169,972 A 10/1979 Black, III et al.
4,185,531 A 1/1980 Oberheim et al.
4,187,528 A 2/1980 Morriss
4,194,099 A 3/1980 Mickelson
4,196,388 A 4/1980 Weller et al.
4,200,862 A 4/1980 Campbell et al.
4,203,096 A 5/1980 Farley et al.
4,206,443 A 6/1980 Britton
4,225,808 A 9/1980 Saraceni
4,246,494 A 1/1981 Foreman et al.
4,253,048 A 2/1981 Osako
4,259,619 A 3/1981 Wall
4,262,180 A 4/1981 Walter
4,274,045 A 6/1981 Goldstein
4,277,727 A 7/1981 LeVert
4,300,090 A 11/1981 Weber
4,303,811 A 12/1981 Parkinson
4,334,171 A 6/1982 Parman et al.
4,336,464 A 6/1982 Weber
4,338,595 A 7/1982 Newman
4,339,632 A 7/1982 Early et al.
4,359,670 A 11/1982 Hosaka et al.
4,381,456 A 4/1983 Saito et al.
4,388,567 A 6/1983 Yamazaki et al.
4,390,814 A 6/1983 Peek
4,392,187 A 7/1983 Bornhorst
4,395,660 A 7/1983 Waszkiewicz
4,418,333 A 11/1983 Schwarzbach et al.
4,421,966 A 12/1983 Pounds
4,436,972 A 3/1984 Scanlon
4,437,169 A 3/1984 Bertenshaw et al.
4,455,546 A 6/1984 Roszel
4,463,287 A 7/1984 Pitel
4,468,542 A 8/1984 Pounds
4,471,493 A 9/1984 Schober
4,484,190 A 11/1984 Bedard
4,485,374 A 11/1984 Meserow et al.
4,489,385 A 12/1984 Miller et al.
4,491,843 A 1/1985 Boubouleix
4,504,778 A 3/1985 Evans
4,521,843 A 6/1985 Pezzolo et al.
4,523,132 A 6/1985 Christiansen et al.
4,524,288 A 6/1985 Schimmelpennink et al.
4,527,198 A 7/1985 Callahan
4,532,395 A 7/1985 Zukowski
4,540,917 A 9/1985 Luchaco et al.
4,550,276 A 10/1985 Callahan et al.
4,560,909 A 12/1985 Peil
4,563,592 A 1/1986 Yuhasz et al.
4,575,660 A 3/1986 Zaharchuk et al.
4,582,967 A 4/1986 Brumit et al.
4,590,614 A 5/1986 Erat
D285,066 S 8/1986 Liss et al.
4,611,198 A 9/1986 Levinson et al.
4,628,440 A 12/1986 Thompson
4,631,377 A 12/1986 Imazeki et al.
4,635,040 A 1/1987 Masot
4,638,299 A 1/1987 Campbell
4,644,320 A 2/1987 Carr et al.
4,680,536 A 7/1987 Roszel et al.
4,684,822 A 8/1987 Angott
4,689,547 A 8/1987 Rowen et al.
4,691,341 A 9/1987 Knoble et al.
4,695,820 A 9/1987 D'Aleo et al.
4,697,227 A 9/1987 Callahan
4,703,306 A 10/1987 Barritt
4,714,983 A 12/1987 Lang
4,716,409 A 12/1987 Hart et al.
4,719,446 A 1/1988 Hart
4,727,296 A 2/1988 Zaharchuk et al.
4,728,949 A 3/1988 Platte et al.
4,737,769 A 4/1988 Masot
4,745,351 A 5/1988 Rowen et al.
4,749,917 A 6/1988 Angott et al.
4,751,385 A 6/1988 Van Benthusysen et al.
4,755,792 A 7/1988 Pezzolo et al.
4,764,981 A 8/1988 Miyahara et al.
4,772,824 A 9/1988 Gulledge
4,772,825 A 9/1988 Tabor et al.
4,783,581 A 11/1988 Flowers et al.
4,792,731 A 12/1988 Pearlman et al.
4,797,599 A 1/1989 Ference et al.
4,814,776 A 3/1989 Caci et al.
4,823,069 A 4/1989 Callahan et al.
4,825,209 A 4/1989 Sasaki et al.
4,843,386 A 6/1989 Wolf
4,864,588 A 9/1989 Simpson et al.
4,876,552 A 10/1989 Zakman
4,878,010 A 10/1989 Weber
4,880,950 A 11/1989 Carson et al.
4,889,999 A 12/1989 Rowen
4,893,062 A 1/1990 D'Aleo et al.
4,908,806 A 3/1990 Nickolaus
4,918,432 A 4/1990 Pauley et al.
4,918,717 A 4/1990 Bissonnette et al.
4,924,109 A 5/1990 Weber
4,924,151 A 5/1990 D'Aleo et al.
4,940,903 A 7/1990 Brown, Jr. et al.
4,948,987 A 8/1990 Weber
D310,349 S 9/1990 Rowen
4,955,084 A 9/1990 Umetsu et al.
D311,382 S 10/1990 Mayo et al.
D311,485 S 10/1990 Jacoby et al.
D311,678 S 10/1990 Graef et al.
4,980,806 A 12/1990 Taylor et al.
D313,738 S 1/1991 Mayo et al.
4,995,053 A 2/1991 Simpson et al.
5,003,318 A 3/1991 Berneking et al.
5,012,225 A 4/1991 Gill
5,017,837 A 5/1991 Hanna et al.
5,027,106 A 6/1991 Lizzi et al.
5,028,853 A 7/1991 Brown, Jr. et al.
5,030,893 A 7/1991 Spira et al.
5,034,602 A 7/1991 Garcia, Jr. et al.
D319,429 S 8/1991 D'Aleo et al.
5,041,825 A 8/1991 Hart et al.
5,051,720 A 9/1991 Kittirutsunetorn
5,059,871 A 10/1991 Pearlman et al.
5,079,559 A 1/1992 Umetsu et al.
5,086,385 A 2/1992 Launey et al.
5,099,193 A 3/1992 Moseley et al.
5,103,209 A 4/1992 Lizzi et al.
5,109,222 A 4/1992 Welty 5,113,498 A 5/1992 Evan et al.
D327,255 S 6/1992 D'Aleo et al.
5,128,855 A 7/1992 Hilber et al.
5,146,153 A 9/1992 Luchaco et al.
5,175,477 A 12/1992 Grissom
5,187,655 A 2/1993 Post et al.
5,189,412 A 2/1993 Mehta et al.
5,191,265 A 3/1993 D'Aleo et al.
5,209,560 A 5/1993 Taylor et al.
5,225,765 A 7/1993 Callahan et al.
5,237,264 A 8/1993 Moseley et al.
5,239,205 A 8/1993 Hoffman et al.
5,247,293 A 9/1993 Nakagawa
5,248,919 A 9/1993 Hanna et al.
5,280,296 A 1/1994 Tan et al.
D344,264 S 2/1994 D'Aleo et al.
5,311,656 A 5/1994 Eldershaw
5,321,736 A 6/1994 Beasley
5,327,426 A 7/1994 Dolin, Jr. et al.
5,340,954 A 8/1994 Hoffman et al.
5,349,362 A 9/1994 Forbes et al.
5,357,170 A 10/1994 Luchaco et al.
5,361,184 A 11/1994 El-Sharkawi et al.
5,361,985 A 11/1994 Rein et al.
5,367,133 A 11/1994 Schmidt et al.
5,373,411 A 12/1994 Grass et al.
5,382,947 A 1/1995 Thaler et al.
5,399,940 A 3/1995 Hanna et al.
5,400,041 A 3/1995 Strickland
5,400,246 A 3/1995 Wilson et al.
5,401,927 A 3/1995 Lundell et al.
5,430,356 A 7/1995 Ference et al.
5,436,510 A 7/1995 Gilbert
5,452,291 A 9/1995 Eisenhandler et al.
5,455,464 A 10/1995 Gosling
5,455,761 A 10/1995 Kushiro et al.
5,463,286 A 10/1995 D'Aleo et al.
5,467,264 A 11/1995 Rauch et al.
5,473,202 A 12/1995 Mudge et al.
5,481,750 A 1/1996 Parise et al.
5,490,144 A 2/1996 Tran et al.
5,495,406 A 2/1996 Kushiro et al.
5,523,631 A 6/1996 Fishman et al.
5,555,150 A 9/1996 Newman, Jr.
5,563,459 A 10/1996 Kurosawa et al.
5,565,855 A 10/1996 Knibbe
5,565,865 A 10/1996 So
5,574,431 A 11/1996 McKeown et al.
5,588,760 A 12/1996 So
5,598,322 A 1/1997 Von Arx et al.
5,637,930 A 6/1997 Rowen et al.
5,638,296 A 6/1997 Johnson et al.
5,640,141 A 6/1997 Myllymäki
4,095,139 A 7/1997 Symonds et al.
5,657,005 A 8/1997 Seebeck et al.
5,668,358 A 9/1997 Wolf et al.
5,711,588 A 1/1998 Rudisill
5,726,644 A 3/1998 Jednacz et al.
5,736,965 A 4/1998 Mosebrook et al.
5,748,828 A 5/1998 Steiner et al.
5,796,382 A 8/1998 Beeteson
5,801,345 A 9/1998 Mikula-Curtis et al.
5,861,809 A 1/1999 Eckstein et al.
5,905,442 A 5/1999 Mosebrook et al.
5,912,443 A 6/1999 Hasunuma
5,960,942 A 10/1999 Thornton
5,962,109 A 10/1999 Schwietz
5,975,711 A 11/1999 Parker et al.
5,977,901 A 11/1999 Fenner
5,982,103 A 11/1999 Mosebrook et al.
6,032,202 A 2/2000 Lea et al.
6,080,940 A 6/2000 Rice
6,091,205 A 7/2000 Newman, Jr. et al.
6,092,903 A 7/2000 Higgins, Jr.
6,100,659 A 8/2000 Will et al.
6,140,987 A 10/2000 Stein et al.
6,169,256 B1 1/2001 Hanahara et al.
6,180,895 B1 1/2001 Hutchinson et al.
6,184,481 B1 2/2001 Chen
6,192,282 B1 2/2001 Smith et al.
6,199,136 B1 3/2001 Shteyn
6,201,364 B1 3/2001 Will et al.
6,207,913 B1 3/2001 Nakajima et al.
6,233,132 B1 5/2001 Jenski
6,310,609 B1 10/2001 Morgenthaler
6,331,687 B1 12/2001 Dunk et al.
6,355,890 B1 3/2002 Kuroda
6,359,562 B2 3/2002 Rubin
6,369,524 B1* 4/2002 Sid ............................ 315/292
6,369,800 B1 4/2002 Nading et al.
6,400,271 B1 6/2002 Davies, Jr. et al.
D461,782 S 8/2002 Butler et al.
6,453,687 B2 9/2002 Sharood et al.
6,467,924 B2 10/2002 Shipman
6,493,874 B2 12/2002 Humpleman
6,510,995 B2 1/2003 Muthu et al.
6,523,696 B1 2/2003 Saito et al.
6,549,190 B1 4/2003 Windrem
6,555,774 B1 4/2003 Nielsen
6,575,607 B1 6/2003 Klemish et al.
6,593,530 B2 7/2003 Hunt
6,608,271 B2 8/2003 Duarte
6,618,764 B1 9/2003 Shteyn
6,640,141 B2 10/2003 Bennett
6,646,843 B1 11/2003 Newman, Jr. et al.
6,674,248 B2 1/2004 Newman, Jr. et al.
6,680,730 B1 1/2004 Shields et al.
6,753,661 B2 6/2004 Muthu et al.
6,774,328 B2 8/2004 Adams et al.
6,797,902 B2 9/2004 Farage et al.
6,882,111 B2 4/2005 Kan et al.
6,909,424 B2 6/2005 Llebenow et al.
6,931,364 B1 8/2005 Anturna
6,950,087 B2 9/2005 Knox et al.
6,965,848 B2 11/2005 Ballus
6,967,448 B2* 11/2005 Morgan et al. ............. 315/295
6,967,565 B2 11/2005 Lingemann
7,130,774 B2 10/2006 Thomas et al.
2001/0000422 A1* 4/2001 Sid ............................ 315/293
2001/0047250 A1 11/2001 Schuller et al.
2001/0047251 A1 11/2001 Kemp
2001/0055003 A1 12/2001 Chi et al.
2002/0016639 A1 2/2002 Smith et al.
2002/0026533 A1 2/2002 Dutta et al.
2002/0037004 A1 3/2002 Bossemeyer et al.
2003/0009315 A1 1/2003 Thomas et al.
2003/0012035 A1 1/2003 Bernard
2003/0052770 A1 3/2003 Mansfield, Jr. et al.
2003/0056012 A1 3/2003 Modeste et al.
2003/0129969 A1 7/2003 Rucinski
2003/0227894 A1 12/2003 Wang et al.
2003/0233429 A1 12/2003 Matte et al.
2004/0024624 A1 2/2004 Ciscon et al.
2004/0037288 A1 2/2004 Bourgart et al.
2004/0038683 A1 2/2004 Rappaport et al.
2004/0054747 A1 3/2004 Breh et al.
2004/0088082 A1 5/2004 Ahmed
2004/0113945 A1 6/2004 Park et al.
2004/0143428 A1 7/2004 Rappaport et al.
2004/0225811 A1* 11/2004 Fosler ........................ 710/305
2004/0267385 A1 12/2004 Lingemann

FOREIGN PATENT DOCUMENTS

DE 30 08 339 A1 9/1981
DE 30 12 840 A1 10/1981

| | | | |
|---|---|---|---|
| DE | 32 21 873 A1 | | 1/1984 |
| DE | 32 24 997 A1 | | 1/1984 |
| DE | 219 637 A1 | | 3/1985 |
| DE | 43 08 161 A1 | | 9/1994 |
| DE | 103-06-080 A1 | | 8/2004 |
| EP | 0 022 516 | | 1/1981 |
| EP | 0 040 339 | | 11/1981 |
| EP | 0 054 582 | | 6/1982 |
| EP | 0 196 347 | | 10/1986 |
| EP | 0 293 569 | | 12/1988 |
| EP | 0 327 128 | | 8/1989 |
| EP | 0 346 614 | | 12/1989 |
| EP | 0 357 136 | | 3/1990 |
| EP | 0 361 734 | | 4/1990 |
| EP | 0 435 224 | | 7/1991 |
| EP | 0 466 152 | | 1/1992 |
| EP | 0 513 443 | | 11/1992 |
| EP | 0 552 769 | | 7/1993 |
| EP | 0 555 869 | | 8/1993 |
| EP | 0 558 349 | | 9/1993 |
| EP | 0 616 451 | | 9/1994 |
| EP | 0 626 635 | | 11/1994 |
| EP | 0 687 078 | | 12/1995 |
| FR | 2 701 115 | | 9/1994 |
| GB | 1090891 | | 11/1967 |
| GB | 1 215 009 | | 12/1970 |
| GB | 2 076 180 | | 11/1981 |
| GB | 2 097 918 | | 11/1982 |
| GB | 2 099 222 | | 12/1982 |
| GB | 2 166 328 | | 4/1986 |
| WO | WO-86/06890 | | 11/1986 |
| WO | WO-90/08418 | | 7/1990 |
| WO | WO-93/13507 | | 7/1993 |
| WO | WO-95/32595 | | 11/1995 |
| WO | WO-97/29560 | | 8/1997 |

OTHER PUBLICATIONS

ADEMCO, "No. 5827BD Wireless Bidirectional Console Installation and Setup Guide," Feb. 2004.
Advanced Control Technologies, Inc., "Innovative and Quality Solutions to Control Problems!" www.act-solutions.com, at least as early as Aug. 23, 2005.
Advanced Control Technologies, Inc., "Introducing the Next Generation of Home Control Systems HomePro RF," Mar. 17, 2006.
Air Conditioning Heating & Refrigeration News, "The search for standard automation protocols narrows," Air Conditioning Heating & Refrigeration News, vol. 191, No. 5, p. 9, Jan. 1994.
Anonymous, "Echelon releases LONWORKS control network protocol, opening up huge potential," Sensor Review, vol. 16, No. 4, p. 9, 1996.
Anonymous, "New products offer high-speed transmission in control networks," Sensor Review, vol. 13, No. 4, p. 39, 1993.
Appliance Manufacturer, "1 Million Nodes," Appliance Manufacturer, vol. 44, No. 1, p. 16, Jan. 1996.
Ballerini et al., "AISI Research and MPR Ltd. to Develop and Market Home Automation Products for Telecommunications Industry," Business Wire, Sec. 1, p. 1, Jun. 2, 1989.
Berger, "Plug-In Remote Controls For The Whole House," Home Mechanix, vol. 88, No. 762, pp. 26-29, 76, Feb. 1992.
Bertsch, "Development Tools for Home Automation," IEEE Transactions on Consumer Electronics, vol. 36, No. 4, pp. 854-858, Nov. 1990.
Beuth Verlag GmbH, "DIN 19 245 Teil 1: Profibus," DIN Deutsches Institute fur Normung E.V., Apr. 1991.
Boughton, "Hard-Wired Home: Automated systems can control everything from lights to curling irons to hot tubs—all at the push of a button," The San Francisco Chronicle, p. Z1, Aug. 30, 1995.
Buffkin, "CEBus, LonWorks heading from 'HomeLAN,'" Electronic Engineering Times, vol. 847, p. 58, May 8, 1995.
Bushby, "The BACnet communication protocol for building automation Systems," Ashrae Journal, pp. 14-21, Apr. 1991.
Business Week, "Getting all your appliances on the same wavelength," Business Week, vol. 3088, p. 92E, Jan. 23, 1989.
Butler, "Personal Technology at Home with Technology: LonWorks may run home of the future," The Atlanta Journal the Atlanta Constitution, p. P6, Nov. 19, 1995.
Butler, "Wireless Light Switch Flexible, Easy to Install," The Columbus Dispatch, p. 10H, Oct. 23, 1993.
Butler, "Add-On Light Switches Eliminate Wiring Hassles," Roanoke Times & World News, p. 3, Jun. 6, 1995.
Bybee, "Build Reacts: The Radio-Electronics Advanced Control System," Radio-Electronics, vol. 59, N o. 10, p. 65, Oct. 1988.
Caristi, "Carrier-current remote control," Electronics Now, vol. 66, No. 6, p. 49, Jun. 1, 1995.
Carlin, "On the bus," Sound & Image, vol. 4, No. 3, p. 20, Fall, 1994.
www.cbus-shop.com, "What's new in CBus ShopTM?" www.cbus-shop.com, at least as early as Jun. 18, 2004.
www.cbus-shop.com, "U105RHH001BPW1: Handheld Remote Unit—Pearl White," www.cbus-shop.com, at least as early as Jun. 18, 2004.
Coffey, "CEBus," email, at least as early as Jul. 2004.
COMPUTE! "Open the pod bay door," Compute!, vol. 14, No. 11, p. 44, Dec. 1992.
Cooper, "X10 FAQ html version. Based on the X10 FAQ version 1.08," Jan. 8, 1995.
Crevier, "Scott Crevier's X-10 Web Interface," at least as early as Nov. 11, 2002.
Cross et al., "A Fiber Optic Home Automation System," IEEE Transactions on Consumer Electronics, vol. 39, No. 3, pp. 636-645, Aug. 1993.
Davidson, "Echelon's Local Operating Network," Circuit Cellar Ink, pp. 74-77, Jun./Jul. 1991.
Davidson, "Take a Tour of the Bright Home," The Computer Applications Journal, vol. 25, pp. 14-21, Feb./Mar. 1992.
Davidson, "CEBus: A New Standard in Home Automation," Circuit Cellar Ink, pp. 40-52, Aug./Sep. 1989.
Davidson, "CEBus Update," Circuit Cellar Ink, pp. S2-S10, Building Automation Special.
Davidson,. "CEBus Gets Physical," Circuit Cellar Ink, pp. 103-104, Feb./Mar. 1991.
Davidson, "CEBus Update: More Physical Details Available," Circuit Cellar Ink, pp. 66-72, Jun./Jul. 1991.
Davidson, "CEBus Goes Coax," The Comptuer Applications Journal, vol. 25, pp. 108-110, Feb./Mar. 1992.
Davidson, "Habitech 94," The Computer Applications Journal, vol. 47, pp. 46-51, Jun. 1994.
Davis, "Zigbee Aims at Home, Utility Markets," www.reed-electronics.com/electronicnews/article/CA469135%20, Oct. 7, 2004.
Delaney, "The CEBus perspective," Appliance Manufacturer, vol. 41, No. 5, p. 31, May 1993.
DiChristina et al., "Controlling the Home," Popular Science, vol. 240, No. 5, p. 48, May 1992.
DiLouie, "Automated Controls Can Save Energy," Facilities Design & Management, vol. 14, No. 11, p. 35, Nov. 1995.
Douligeris et al., "The Consumer Electronic Bus Symbol Encoding Sublayer: A Twisted Pair Implementation," IEEE, pp. 385-388, 1992.
Douligeris, "Intelligent Home Systems: Low-cost computers and fiber optics make it possible to implement systems that can integrate data, voice, and visual communications inside the home," IEEE Communications Magazine, pp. 52-61, Oct. 1993.
Douligeris et al., "Communications and Control for a Home Automation System," IEEE, pp. 171-175, 1991.
Driscoll, "A Timeline for Home Automation," www.eddriscoll.com, 2002.
Edden, "Modelling CEBus Home Automation with Knowledge Based Tools," IEEE, pp. 623-627, 1990.
Electronic Engineering Times, "LONworks gets interface boards," Electronic Engineering Times, p. 54, Jul. 3, 1995.
Electronic Industries Association, EIA-600 (Sections 600.10, 600.31, 600.32, 600.33, 600.35, 600.37, 600.38, 600.41, 600.42, 600.81, and 600.82). Feb. 1995.

Electronic News, "New CEBus devices target energy management," Electronic News, vol. 40, No. 2006, p. 48, Mar. 21, 1994.
Electronic News, "Intellon-IBM CEBus deal eyes energy/com system," Electronic News, vol. 41, No. 2063, p. 24, May 1, 1995.
Electronic News, "Intellon spins home automation roadmap," Electronic News, vol. 41, No. 2064, p. 46, May 8, 1995.
Electronics Australia, "WA firm wins US automation award," Electronics Australia, vol. 57, No. 1, p. 123, Jan. 1995.
Evans, "Solving Home Automation Problems Using Artificial Intelligence Techniques," IEEE, pp. 395-400, 1991.
Evans, "CAL: Part of the Solution," Home Automation & Building Control, pp. 59-67, Jul. 1995.
Evans, The CEBus Standard User's Guide: A Complete Technical Overview, The Training Department Publications, 1996.
Fisher, "Switch-On CEBus: A CAL Interpreter," The Computer Applications Journal, vol. 31, pp. 24-30, Feb. 1993.
FUTURIST, "Home automation," Futurist, vol. 28, No. 5, p. 7, Sep./Oct. 1994.
GE. Appendix A, GE Authentication and Encryption Algorithm. Version II. Nov. 1995.
Gfeller et al., "Wireless In-House Data Communication via Diffuse Infrared Radiation," Proceedings of the IEEE, vol. 61, No. 11, pp. 1474-1486, Nov. 1979.
Gikas, "Total Home Control Home Control from Your Car," Home Mechanix, vol. 91, No. 794, p. 24, Apr. 1995.
Gilmore, "The integrated automated educated house," Popular Science, vol. 236, No. 6, p. 104, Jun. 1990.
Gilmore, "The World's Smartest Houses," Popular Science, vol. 237, No. 3, pp. 56-65, Sep. 1990.
Gilmore et al., "Open (automated) house," Popular Science, vol. 237, No. 4, p. 48, Oct. 1990.
www.globalsuccessinc.com, "Home Automation: GSI Home Automation Controller—The Next Generation in Home Automation!" www.globalsuccessinc.com, 2003.
Gorzelany, "Hot new electronics," J. Consumers Digest, vol. 28, No. 3, p. 74, May/Jun. 1989.
Home Controls, Inc., Home Automation and Networking Catalog, No. 52, Fall 2005.
Homepro, "ZTH100 Radio Frequency Wireless Controller," 2001.
www.homeseer.com, "Z-Wave Information," www.homeseer.com, at least as early as Jun. 21, 2004.
www.homeseer.com, "Z-Wave Lamp Module (HomePro)," www.homeseer.com, at least as early as Jun. 21, 2004.
www.homeseer.com, "Z-Wave Remote Control (ivory)," www.homeseer.com, at least as early as Jun. 21, 2004.
HOUSE, "CEBus for the Masses," Home Automation & Building Control, pp. 61-68, Apr. 1995.
Hunt et al., "Are We There Yet?: CEBus Ready to Bring 'Home of the Future' into the Present," Chicago Tribune, p. 22, Mar. 1, 1996.
Intellon Corporation, "Intellon HomePlug7 Family of Products," 2005.
Intellon Corporation, "SSC P485 PL Transceiver IC," at least as early as Jul. 3, 2006.
Interim Standard. IS-60.04 Node Communications Protocol, Part 6: Application Layer Specification. Apr. 1996.
Iversen, "A New Push Begins to Sell a Home Bus," Electronics, vol. 61, No. 12, p. 40, Jun. 1988.
IW, "Building Blocks for Home Automation," IW, p. 23, May 15, 1995.
Jancsurak, "Smart receptacle for smart plugs," Electronic Industries Association, vol. 41, No. 4, p. 62, Apr. 1993.
Karpinski, "In-home networks draw industry attention," Interactive Age, vol. 2, No. 6, p. 39, Jan. 16, 1995.
Keefe, Jr., "Power Line Modem for Home Control," Electronics Now, p. 65, Mar. 1994.
Khawand et al., "Common Application Language (CAL) and Its Integration into a Home Automation System," IEEE, pp. 157-162, 1991.
Kingery, "Which One Should I Use?" at least as early as Jun. 30, 2006.
Kingery, "Which One Should I Use, Part XII (Preamble)," at least as early as Jun. 30, 2006.
Kingery, "'Digital X-10' Which One Should I Use, Part XIII (Preamble)," at least as early as Jun. 30, 2006.
Kingery, "'Two Way and Extended Code' Which One Should I Use, Part XIV (Preamble)," at least as early as Jun. 30, 2006.
Kingery, "Which One Should I Use #17, What is 'Extended Code'? (and does it wear a tuxedo?) Part 1—'Different Ways of Counting,'" at least as early as Jun. 30, 2006.
Kingery, "Which One Should I Use #18. What is 'Extended Code'? Part 2—'Big Indians and Little Indians,'" at least as early as Jun. 30, 2006.
Kirschner, "Smarts at last?" Popular Science, vol. 247, No. 1, p. 38, Jul. 1995.
Kleiman, "MacDaniel's Advice: Introduction to the X10 System," Sep. 24, 2001.
Krause, "Echelon-CEBus rivalry tangles decoder specs," Electronic News, vol. 41, No. 2067, p. 1, May 29, 1995.
Krause, "EIA sees potential CEBus role in U.S. NII Proposal," Electronic News, vol. 40, No. 2021, p. 38, Jul. 4, 1994.
Kung, "Perceived requirements concerning home automation," Trialog, pp. 1-5, Dec. 1995.
Lamson & Sessions, Product Installation Instructions, 2004.
Langreth, "Slow going for smart homes," Popular Science, vol. 242, No. 2, p. 60, Feb. 1993.
Leeb, "A User Interface for Home-Net," IEEE, pp. 897-902, 1994.
Lutron Electronics Co., Inc., "Homeworks7 seeTouch J Ordering Guide," 2003.
Lutron Electronics Co., Inc., "Homeworks7 Interactive Vareo7-Style Local Lighting Controls," 1998.
Lutron Electronics Co., Inc., Residential Lighting Controls Catalog, at least as early as Jun. 28, 2006.
Lutron Electronics Co., Inc., "RadioRA7 Wireless Home Lighting Control RA-IR, RB-IR Setup and Installation Guide Addendum for RadioRA7 Infrared Interface," 2001.
Lutron Electronics Co., Inc., "RadioRA7 Wireless Home Lighting Control RAMC-MFE, RBMC-MFE Setup and Installation for a RadioRA7 Multi-Function Entry Master Control," 2001.
Lutron Electronics Co., Inc., "RadioRA7 Wireless Home Lighting Control Installation Instructions for Visor Control Transmitter," 2001.
Markwalter et al., "Design Influences for the CEBus Automation Protocol," IEEE, pp. 145-153, 1991.
McGrath, "Seizing the future," Electronic Perspectives, vol. 14, No. 6, p. 14, Nov./Dec. 1990.
McLeister, "Builders in Subdivisions, Scattered Sites Gain Edge with Home Automation," Professional Builder, pp. 82-83, Feb. 1995.
McLeister, "Dramatic Changes Lie Ahead For Home Automation," Professional Builder, p. 101, Feb. 1994.
Meth, "Where Will Smart Homes Get Their Smarts?" Electronic Design, vol. 43, No. 19, pp. 61-64, Sep. 18, 1995.
Munro, "Automating the Home," Washington Technology, p. 1, Nov. 9, 1995.
Murray, "Wired and ready," Popular Science, vol. 247, No. 2, p. 36, Aug. 1995.
Nisley, "Two-Way Power Line Communication," The Computer Applications Journal, vol. 25, pp. 74-81, Feb./Mar. 1992.
Pacelle, "Automation Is Knocking at U.S. Homes—TVs Can Talk to Thermostats, but Cost Keeps Most Doors From Opening," Asian Wall Street Journal, p. 7, Sep. 29, 1992.
Palenchar, "Z-Wave Takes on Home-Automation Market," www.twice.com, Mar. 22, 2004.
Pargh, "High-tech functions improve new light switches," Chicago Sun-Times, p. 7, Oct. 7, 1990.
Parks, "The State of Home Systems," The Computer Applications Journal, vol. 25, pp. 12-13, Feb./Mar. 1992.
Parks Associates, Home Systems 94: Home Controls, Parks Associates, Dallas, 1994.
Parks et al., X-10 Ltd. Myths and Reality: The Facts Behind the Company and the Technology, Parks Associates, Dallas, 1994.
Phillips, "Installing a Home Alarm: Protect your property and enjoy extra conveniences with an affordable do-it-yourself system," Home Mechanix, vol. 90, No. 782, p. 60, Feb. 1994.

Price, "Product Development Flow Using Domosys HeadStart Suite," www.hometoys.com/htinews/aug99/articles/domosys/domosys.htm, Aug. 1999.
PR Newswire, "Cyberhouse Software Wins Mark of Excellence Award from Home Automation Association," PR Newswire, p. 325, Mar. 25, 1996.
Professional Builder, "From start to finish: Molex's SMART HOUSE home automation system means quality," Professional Builder, vol. 59, No. 10, p. 18, Oct. 1994.
Professional Builder, "Home automation networks links public utility," Professional Builder, vol. 59, No. 7, p. 64, Jul. 1994.
Professional Builder, "Home automation & electronics," Professional Builder, vol. 60, No. 2, p. 350, Mid-Jan. 1995.
Professional Builder, "Exclusive survey results: Home buyers & the intelligent house," Professional Builder, vol. 60, No. 19, p. 13, Dec. 1995.
Rabbie, title unknown, 1992.
Radio-Electronics, "CEBus Developments," Radio-Electronics, vol. 62, No. 8, p. 4, Aug. 1991.
Remlich, Jr., "Intelligent gas appliances," Appliance Manufacturer, vol. 41, No. 3, p. 63, Mar. 1993.
RF LOCKER, "RF Locker," at east as early as Jul. 2004.
Rochfort, "Sensory experience," Custom Builder, vol. 9, No. 5, p. S-28, Sep./Oct. 1994.
Ruling, "The Wybron Autopilot," TCI, vol. 29, No. 4, p. 54, Apr. 1995.
Schade, "Convenient Remote-Control Light Switching Saves Energy," Energy & Automation, vol. 9, No. 1, pp. 37-39, Jan./Feb. 1987.
Schade, "Switching of Lighting Installiations by Remote Control," Elektrische Energie-Technik, vol. 29, No. 2, p. 18, Jun./Jul. 1984.
Schade, "New Aspects in the Horizontal Power Supply of Lighting Installations," Siemens Power Engineering, vol. 6, No. 4, pp. 238-239, Jul./Aug. 1984.
Schofield, "Home Automation Takes Off: Intellon products support a 'home electronic highway,'" Design News, pp. 84-87, Apr. 10, 1995.
www.shed.com, "x-10 is both a Company and the Technology that it developed," www.shed.com/x10.html, at least as early as Jun. 30, 2006.
www.smarthomepro.com, "Introducing Digital Wireless Lighting and Appliance Control," www.smarthomepro.com, at least as early as Jun. 21, 2004.
www.smarthomeusa.com, "Z-Wave Radio Frequency Wireless Controller," www.smarthomeusa.com, at least as early as Jun. 19, 2004.
www.smarthome.com, "Sophisticated Lighting Control for Your Home," www.smarthome.com, at least as early as Jun. 18, 2004.
www.smarthome.com, "Getting Started," www.smarthome.com, at least as early as Jun. 21, 2004.
www.smarthome.com, "A Full-Featured Dimmer for Every Home!" www.smarthome.com, at least as early as Jun. 21, 2004.
www.smarthome.com, "What is X10?" www.smarthome.com, at least as early as Jun. 21, 2004.
www.smarthome.com, "Automatically Turn On X10 Lights When You Enter the Room!" www.smarthome.com, at least as early as Jun. 18, 2004.
www.smarthome.com, "Control Lights and Appliances from the Comfort of Your Sofa!" www.smarthome.com, at least as early as Jun. 21, 2004.
Stauffer, "The Smart House System," The Computer Applications Journal, vol. 31, pp. 14-23, Feb. 1993.
Strassberg, "Home Automation Buses: Protocols really hit home," EDN, pp. 69-80, Apr. 13, 1995.
Taber, "The Arrival of a World Without Wires," Business for Central New Jersey, vol. 2, No. 3, Section 1, p. 3, Feb. 13, 1989.
Tanenbaum, Computer Networks, Prentice-Hall, Inc., Englewood Cliffs, New Jersey, pp. 144, 271-275, 1989.
TCI, "Lighting control (Buyers Guide)," TCI, vol. 28, No. 10, p. 56, Dec. 1, 1994.
Texas Instruments, Chipcon Products from Texas Instruments, 2006.
Teyssier, "BatiBUS: BatiBUS System Design Principles," Jun. 1990.
Uhara et al., "Development of HI (Home Information) Control System," Sharp Technical Journal, vol. 59, pp. 39-42, Aug. 1994.
www.unitysystemshomemanger.com, "Lighting & Appliance Control," www.unitysystemshomemanager.com, at least as early as Jun. 23, 2004.
Unknown, "What is X10?" unknown, at least as early as Jul. 18, 2006.
Unknown, "X-10 Technology Transmission Theory," unknown, at least as early as Jul. 18, 2006.
Wacks, "The Impact of Home Automation on Power Electronics," IEEE, pp. 3-9, 1993.
Williams, "Brightening Up The House: Latest Technology, Marketing Developments Bring Sophisticated Home Automation Closer to the Masses," Chicago Tribune, p. 1, Mar. 3, 1996.
Winick, "The RF Medium in the Home—The Move to Spread Spectrum," IEEE Transactions on Consumer Electronics, vol. 37, No. 2, pp. 108-115, May 1991.
"Wireless hookups offered through radio technology," UCLA.
www.x10.com, "Let There Be Light," www.x10.com/news/articles/0309_light.htm, at least as early as Jul. 18, 2006.
www.x10.com, "SuperRemote Home Control Kit," www.x10.com, at least as early as Jun. 18, 2004.
www.x10.com, "X10 Powerline Carrier (PLC) Technology," www.x10.com/support/technology1.htm, at least as early as Jun. 30, 2006.
X10PRO, "X10 Platform Basics," at least as early as Jun. 30, 2006.
Yoshida, "LONWorks connects," Electronic Engineering Times, vol. 769, p. 16, Oct. 25, 1993.
Zhonglei, et al., "Simultaneous Control Signal and Power Transmission Through Mechanical Rotary Joint Without Wiring Connection," IEEE, pp. 1589-1593, 1996.
Horowitz et al., The Art of Electronics, 1989, Cambridge University Press, 2nd Ed., pp. 595-598.

* cited by examiner

SYSTEM AND METHOD FOR COMMISSIONING ADDRESSABLE LIGHTING SYSTEMS

CROSS-REFERENCE TO RELATED APPLICATIONS

This application claims the benefit of U.S. Provisional Application No. 60/500,193, filed Sep. 3, 2003, which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

STATEMENT REGARDING FEDERALLY SPONSORED RESEARCH OR DEVELOPMENT

Not Applicable.

BACKGROUND OF THE INVENTION

1. The Field of the Invention

The present invention relates generally to systems and methods for commissioning, and more particularly, but not necessarily entirely, to systems and methods for commissioning addressable lighting systems.

2. Background Art

Technology for lighting systems has substantially increased in complexity and capability over the past decade. Traditionally, lights simply provided illumination via simple wiring of light switches and dimmers. More recently, additional functionality has been incorporated into lighting systems to provide additional features and, more importantly, to provide energy conservation. For example, it might be desirable to dim or turn off certain lights to set certain scenes depending on the specific conditions, such as the day of the week, time of day, or even season of the year. In addition, it might be desirable to dim or turn off unnecessary lights, even dim or extinguish only selected lights in a room, to conserve energy.

Digitally addressable lighting is slowly emerging as a popular means for controlling complete lighting environments for a wide variety of different applications. Individual control of each lamp enables the end user to precisely deliver the correct amount of light when and where it is required. Managing the light in this manner potentially allows for a massive reduction in global energy consumption due to lighting. Industrial environments can conserve the total energy required for lighting while actually increasing light quality in certain areas at given times by using modern lighting control systems.

A complete digital dimming system includes the dimming ballasts, in the case of lamps which require a ballast, and a digital control unit for converting information received from a network connection to the communication protocol required by the micro-controller in each ballast. Applications for such systems include building management or studio lighting where it is desired to control a single lamp, or groups of lamps, for conserving energy, performing lamp maintenance or creating precision lighting effects.

Digital dimming ballasts typically include an EMI filter, rectifier, power factor correction, and ballast output stage. The digital ballast also includes a micro-controller for sending and receiving information digitally. The micro-controller functions include storing the ballast address, receiving user instructions, setting the dim reference for the ballast control, receiving status information from the ballast control and sending status information back to the user. The digital ballast potentially allows for complete and precise control of an entire lighting environment.

In the past, the analog 1-10V control interface was the most common industry standard for controlling ballasts. However, the 1-10V control interface has been shown to be inflexible and is slowly being replaced by a new standard known as the Digital Addressable Lighting Interface-protocol or DALI-protocol or just DALI.

DALI is an international standard that has been described in IEC 60929 which establishes the electronic ballast performance requirement. DALI has been designed in a joint effort by many control equipment manufacturers. DALI is advantageous because of its simple wiring control lines and because it allows control over single units (for example, lamps). In addition, the status of each unit may be queried and ascertained.

DALI is currently designed for a maximum of sixty-four single units having individual addresses, a maximum of sixteen groups, and a maximum of sixteen scenes. The "intelligence" has been decentralized to the ballasts, i.e., the values of many set points and lighting values are stored within the individual ballasts. All functions are carried out locally.

Each ballast connected to a DALI controlled system has its own address. An address stands for the definite designation of a unit within a DALI-system. This way each ballast can be contacted individually, although it is connected to a DALI system-line like all the other units. The address assignment, for example, must be effected when the system is put into operation. All units of a system can be contacted at the same time by way of a broadcast.

A differentiation is made between individual addresses and group addresses. Sixty-four individual addresses exist in the DALI-system. Thus, one or several control units can contact individually, i.e. a maximum of sixty-four ballasts. Each ballast may also be part of a maximum of sixteen groups. The plurality of control units can be part of a larger network. In theory, the number of individual ballasts on a network may be unlimited. The DALI control bus comprises two-wires. Any wiring topology can be used, such a line, star or mixed.

One drawback to using the DALI system occurs during the commissioning process. As used herein, the commissioning process entails identifying the physical location of each ballast and its respective address or ID. Typically, all ballasts have an associated address stored by the manufacturer during production. When the DALI system is first activated, each ballast registers with a control unit its respective address. It will be appreciated that the physical location of each ballast may not be known, because there may be up to sixty-four ballasts connected to the control unit. The ballasts may be spread across different rooms, floors or even buildings. In addition, where multiple control units are being used, it may not even be possible to tell which ballasts are controlled by which control units.

In the past, there have been primarily two methods used to commission a DALI system. The first method has been to keep track of the physical location where each ballast is installed in a structure and record its location and the corresponding ballast address. This method has severe drawbacks. First, this method requires that the addresses be printed on the outside of the ballast. Some manufacturers of ballasts may not do this. Secondly, in large scale operations, this may be overly cumbersome and error prone. Next, often the electricians installing the ballasts are not the same individuals who will be initiating the DALI system requiring a high level of cooperation. Finally, the biggest drawback is that even if the addresses and locations are correctly recorded during installation, the DALI system has a randomizing feature that reassigns addresses randomly to each ballast thereby, if such a randomizing feature is purposefully or inadvertently invoked, negating any recorded information.

The second method entails first initiating the DALI system thereby allowing each ballast to register its address with the control unit. Then, a person physically disconnects each lamp, typically by climbing a ladder to reach the lamp, controlled by the system one by one. The control unit will indicate which address has a disconnected lamp. In this manner, the physical location associated with each address can be ascertained. It will be appreciated that in large scale operations, physically disconnecting and reconnecting each lamp one by one is cumbersome and time consuming.

Despite the advantages of known DALI systems, improvements are still being sought. For example, the current known methods of commissioning has significant drawbacks in that it is overly cumbersome and time consuming.

The available methods and devices are thus characterized by several disadvantages that are addressed by the present invention. The present invention minimizes, and in some aspects eliminates, the above-mentioned failures, and other problems, by utilizing the methods and structural features described herein.

The features and advantages of the invention will be set forth in the description which follows, and in part will be apparent from the description, or may be learned by the practice of the invention without undue experimentation. The features and advantages of the invention may be realized and obtained by means of the structures and combinations particularly pointed out in the appended claims.

BRIEF DESCRIPTION OF THE DRAWINGS

The features and advantages of the invention will become apparent from a consideration of the subsequent detailed description presented in connection with the accompanying drawings in which.

DETAILED DESCRIPTION OF THE ILLUSTRATIVE EMBODIMENTS

Figure 1:
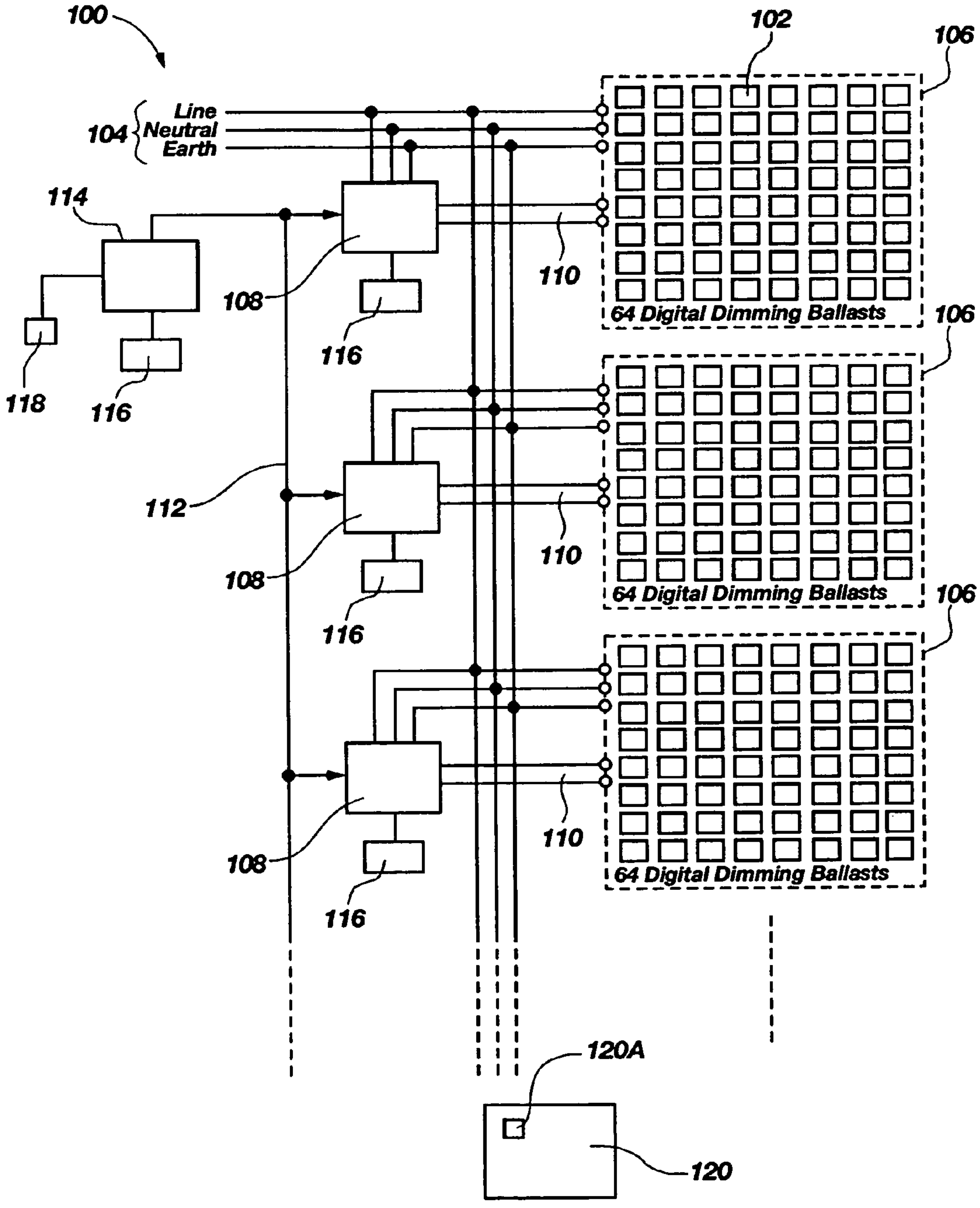
FIG. 1 is a diagram of an exemplary embodiment of the present invention.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

It must be noted that, as used in this specification and the appended claims, the singular forms "a," "an," and "the" include plural referents unless the context clearly dictates otherwise. In describing and claiming the present invention, the following terminology will be used in accordance with the definitions set out below.

As used herein, "comprising," "including," "containing," "characterized by," and grammatical equivalents thereof are inclusive or open-ended terms that do not exclude additional, unrecited elements or method steps.

The DALI Manual (copyright 2001) published by the Digital Addressable Lighting Interface Activity Group aka DALI AG, and available on the internet at www.dali-ag.org, is hereby incorporated by reference in its entirety herein. Moreover, the references discussed herein are provided solely for their disclosure prior to the filing date of the present application. Nothing herein is to be construed as a suggestion or admission that the inventors are not entitled to antedate such disclosure by virtue of prior invention.

Referring now to FIG. 1, there is generally shown one example of a DALI system 100. Each ballast 102 is connected to a power supply 104 and a control unit 108 through a two-wire bus 110 (individual connections not shown). Each control unit 108 is also connected to the power supply 104. Three subsystems 106, each comprising sixty-four ballasts, one of which is designated 102, the maximum allowed under current DALI standards, are also represented. Each subsystem 106 may be controlled by a single control unit 108.

Each control unit 108 may be further connected to a network 112. A control system 114 may also be connected to the network 112. The network 112 may enable two-way communication between the control system 114 and each control unit 108. It will be appreciated that each control unit 108 is also in two-way communication with each ballast 102 via the two-wire bus 110. In this manner, the control system 114 may have two-way communication with each individual ballast 102. In addition, any number of additional subsystems 106 and control units 108 may be added to the network 112.

Each control unit 108 may receive control signals over the network 112 from the control system 114 which in turn may control an individual ballast 102. The network 112 may comprise any type of network 112 including, without limitation, Ethernet, LAN, and internet. The network 112 may also be a bus, such as a two-wire bus, or even wireless using RF transmissions. In addition, each control unit 108 may receive control signals from devices 116, such as keypads, timers, remote control using IR or RF, or sensors, or any other type of similar device. It should also be noted that the control system 114 may also receive control signals from devices 116 connected to the control system 114 to control any of the ballasts 102.

Various brands of control units 108 are available on the market, all of which can be used in conjunction with the principles of the present invention.

The control system 114 may comprise any system used to control lighting with automation, including large scale building automation systems, commercial automation systems and even home automation systems. The control system 114 may include applications running on any computer, such as PC, or on proprietary hardware. Examples of a control system 114 are the C-Box controller and the Master Controller manufactured by Vantage, Inc. of Orem, Utah. Other brands of control systems are available on the market or may become available on the market, all of which can be utilized within the scope of the present invention.

A control system 114 may have a dedicated terminal for user input and/or showing "live" information about the system 100. A control system 114 may be connected temporarily to a computer or display, such as a PC or laptop computer, to accept user input.

A control system 114 further comprises a structure for communicating on the network 112. The type of structure is determined by the network 112. If the network 112 is wireless, for example, then the control system 114 may comprise an antenna for communicating on the network 112.

As explained above in the background section, when a DALI system is first initiated, i.e. turned on for the first time, each of the ballasts 102 may register its electronic address with the control unit 108 and/or control system 114. The electronic address may have been assigned by the manufacturer during production. If no address has been assigned, each individual ballast 102 may generate a random address. Sixty-four individual addresses exist in a DALI-system. In addition, the control system 114 may send a command for each ballast 102 to randomly select a new address even if the ballast 102 already has an address.

It will be appreciated that the addresses allow the control unit 108 and control system 114 to conduct two-way communication with a ballast 102. Signals are broadcasted widely in each subsystem 106. A ballast 102 will only process a signal containing its own individual address.

Once the system 100 has been initiated for the first time, it may be possible to ascertain the number of ballasts 102 connected to the system 100 and even view a listing of the addresses of a the ballasts 102 connected to the system 100. However, it may not be possible to identify the address of a ballast 102 in a particular physical location. It is often necessary to assign a name to a ballast 102 or a group of ballasts 102 for easy recognition. The name should identify the location of the ballast 102 for future reference.

A group of ballasts 102 may all be controlled simultaneously using a single command signal. A group may have its own unique address. A plurality of groups may be formed from any subsystem 106. The current DALI protocol allows the formation of up to sixteen groups.

For example, a ballast 102 controlling a lamp in a supply room might be named "supply room." If the supply room contained more than one ballast 102, each ballast 102 in the supply room may be assigned to a group named "supply room." Further, each individual ballast 102 could be further identified with an individual name further specifying its location, such as "supply room, left corner."

It should be noted that the use of names is arbitrary, and that any symbol or other identifier used to group ballasts together is sufficient.

The present invention provides a wireless device 120, for assisting with the commissioning process. The wireless device 120 is capable of interfacing with the control system 114 through an antenna 118 connected either directly or indirectly to the control system 114. The wireless device 120 may also comprises an antenna 120A for communicating with the control system 114. The wireless device 120 and the control system 114 may communicate using RF transmissions. In addition, if the control system 114 is already connected to the network 112 which has a wireless component, then the wireless device 120 can communicate with the control system 114 through the network 112.

The wireless device 120 should be portable such that the wireless device 120 can be transported easily around an area of interest, most often a structure or structures, in which the system 100 is installed. The wireless device 120 may be a laptop or other portable computing device capable of wireless communications. Running on the wireless device 120 is an application for interfacing with the control system 114. The application may have a graphical user interface for facilitating communication with the control system 114.

In particular, the wireless device 120 should allow a user to assign individual ballasts 102 to a group. The wireless device may further allow each ballast 102 and/or group to be assigned a name. The wireless device 120 may also allow a user to determine which ballasts 102 are currently assigned to a group and which ballasts 102 are currently unassigned to a group. The wireless device 120 may allow all of the ballasts 102 in a group to be identified.

In addition, the wireless device 120 may also send a command through the control system 114 directing a particular ballast 102, including uncommissioned ballasts 102, to change the current state of the lamp which it controls. For example, the command may instruct the ballast 102 to blink or flash the lamp which it controls. The command may also instruct the ballast 102 to cycle the lamp to which it is attached from a dim setting to a bright setting. Any change of state that can be observed by a person will suffice for the purposes of this invention.

It will be appreciated that with this capability, that a person can transport the wireless device 120 throughout a structure in which the system 100 is installed, such as a commercial building, to commission each of the ballasts 102. In one illustrative example of the present invention, the wireless device 120 is transported to a location in the structure to where it is believed that there may be one or more uncommissioned ballasts 102. A user may then instruct the system 114 through the wireless device 120 to alter the state of one of the lamps connected to an uncommissioned ballast 102.

During this time, the user monitors the lamps in his or her general area. If no change is observed, the user may continue to cycle through all of the uncommissioned ballasts 102 repeating the same process. If a change is observed in the state of one of the lamps while a particular uncommissioned ballast 102 has been commanded to change state, then the user may then commission that ballast since its location is now known. This process may be repeated until all of the uncommissioned ballasts 102 for a system 100 are commissioned.

It should be noted that the wireless device 120 may be programmed to cycle through all of the uncommissioned ballasts 102 automatically for a specified period of time. For example, by pressing a key or clicking on a button on a display of the wireless device 120, the uncommissioned ballasts 102 may begin flashing for a period of five seconds and then advance to the next uncommissioned ballast 102. When an observed lamp flashes, the user may hit another key or click a button to stop the process. In addition, the user may optionally be able to move incrementally forward or backwards through a list of uncommissioned ballasts 102.

The wireless device 120 may also be capable of sending a command to vary the states of all the lamps of all of the ballasts assigned to a particular group simultaneously. It will be appreciated that this will allow it to easily be determined that all the desired ballasts are in the group. For example, if it is desired that all of the lamps in a particular room or area be in the same group, by flashing all of the lamps in the group and observing the results it can easily be determined if the group is complete.

Figure 2:
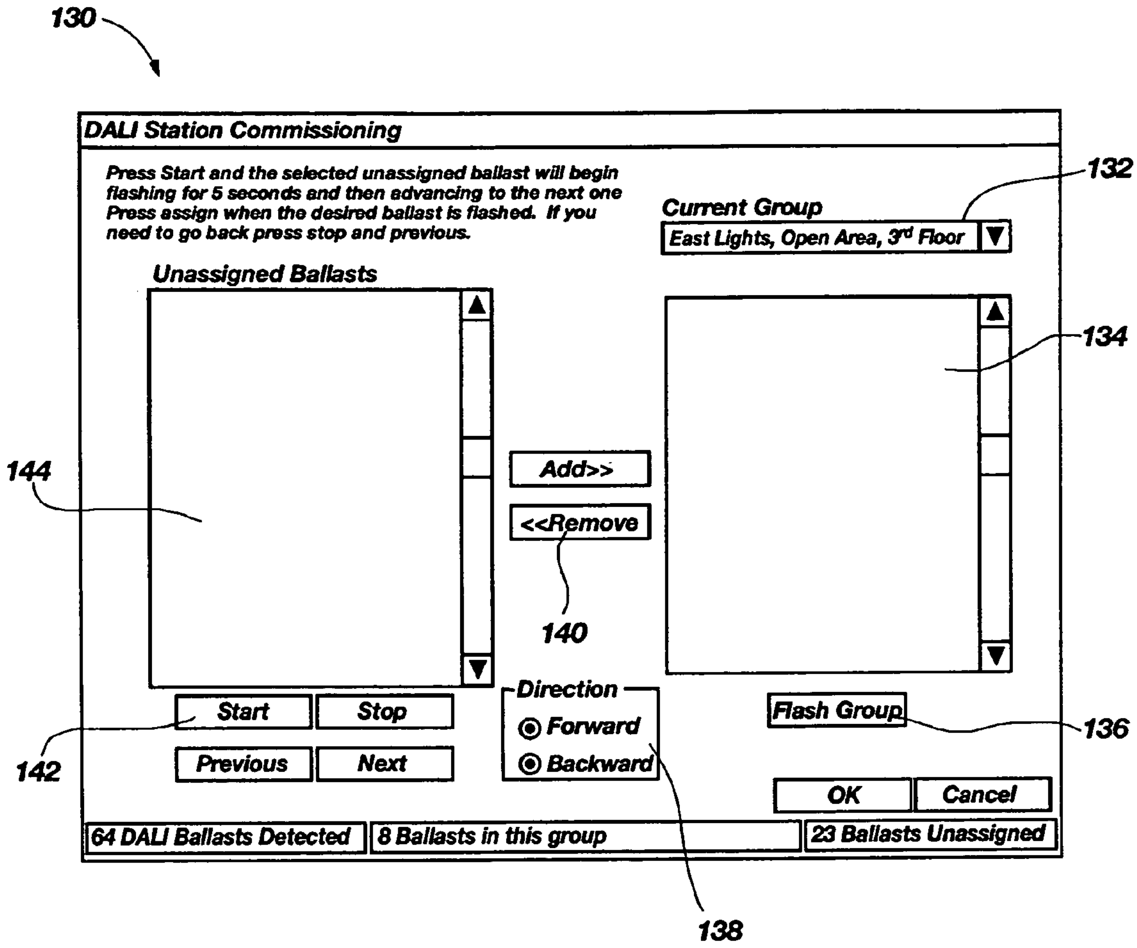
FIG. 2 is a representation of one exemplary interface displayed on a wireless device.

FIG. 2 illustrates one exemplary graphical user interface 130 that can be displayed on the wireless device 120 to assist in the commissioning process as contemplated by the present invention. A box 132 showing the current group may be displayed. A box 134 showing the ballasts assigned to the group may be displayed. A button 136 for flashing all of the lights connected to the ballasts listed in box 134 may also be present. When button 136 is selected, all of the lights connected to the ballasts listed in box 134 will flash for a preset length of time. Box 138 allows the direction for cycling through the list of uncommissioned ballasts, box 144. Buttons 140 allow uncommissioned ballasts listed in box 144 to be assigned to a group. Buttons 144 allow for controlling an automated cycling sequence through the uncommissioned ballasts listed in box 144.

It will be appreciated that the present invention significantly reduces the time and the effort previously required during the commissioning process. The need to disconnect each lamp individually or keep track of electronic addresses and locations during the installation process is eliminated.

It should be further noted that the present invention is applicable to any protocol/system having addressable lighting. The present invention is not limited to the DALI protocol or the limitations set therein.

Figure 3:
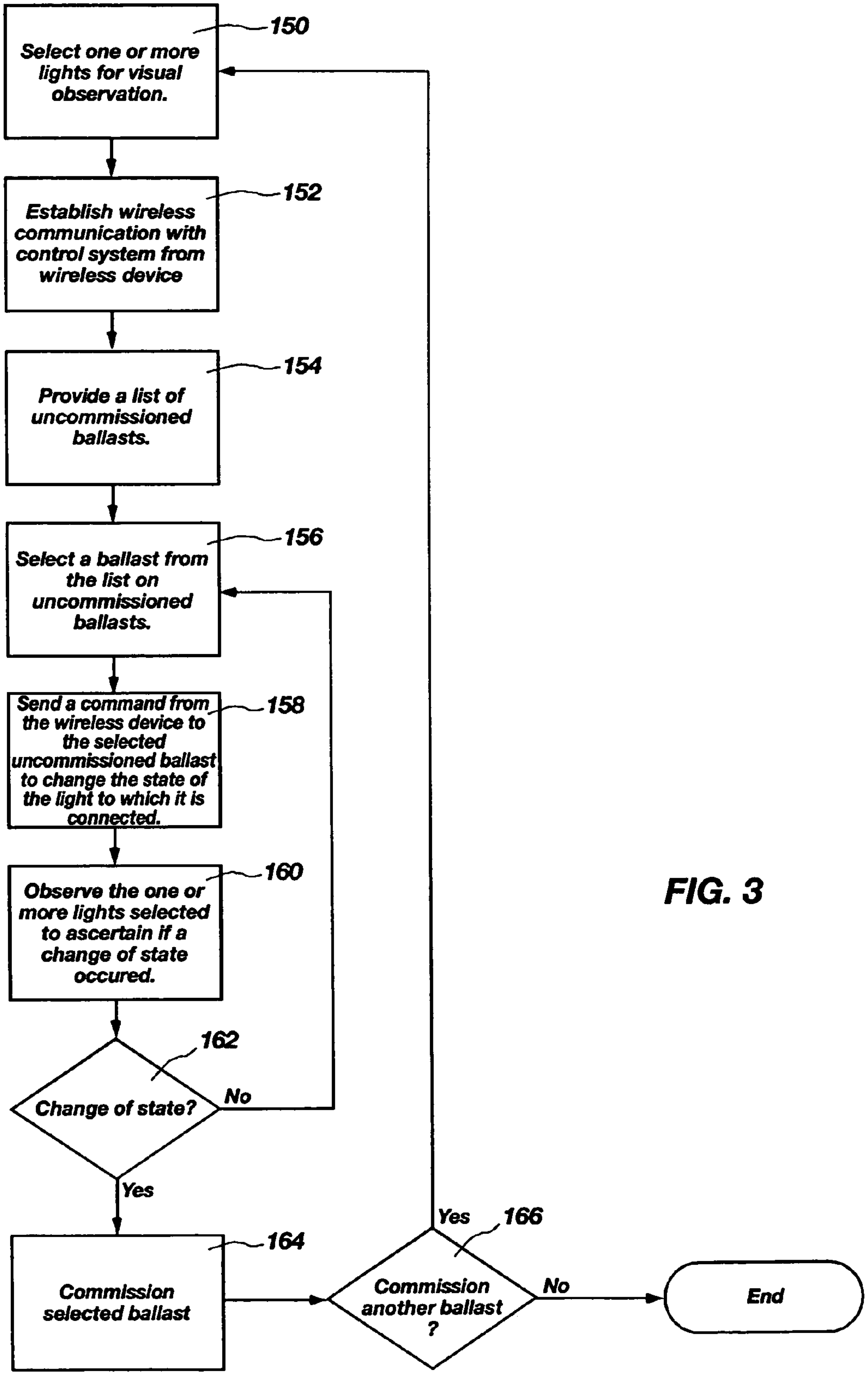
FIG. 3 is a flow chart illustrating the steps to carry out one illustrative embodiment of the present invention.

In accordance with the features and combinations described above, a useful illustrative method of commissioning one or more ballasts is illustrated in FIG. 3. The steps comprise first selecting for visual observation one or more lights controlled by an addressable lighting system (step 150). Next, a wireless device is used to establish a wireless connection with a control system (step 152). The next step is to provide a list of uncommissioned ballasts and select a ballast from the list (steps 154 and 156). The user then sends a command to the selected ballast to vary the state of the light to which it is attached (step 158). The user then observes the lights selected in step 150 to ascertain if a corresponding change in state takes place (step 160). If no change in state occurs, then another ballasts from the list is selected and the procedure is repeated (step 162). If a change of state is observed, it means that the physical location of the light controlled by the ballast has been ascertained and the ballast may be commissioned (step 164). These steps may be repeated until each uncommissioned ballast is commissioned (step 166).

Those having ordinary skill in the relevant art will appreciate the advantages provided by the features of the present invention. For example, it is a feature of the present invention to provide a wireless device for commissioning ballasts by interfacing from remote locations with a control system.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A system for commissioning a plurality of ballasts connected to an addressable lighting system in an area of interest, each ballast controlling an on, off or intensity level of a light, said system comprising:

a control system, said control system connected to the addressable lighting system;

a wireless device, said wireless device capable of communicating with the control system via wireless transmissions throughout the area of interest;

means, at least partially provided on said wireless device, for allowing a user to vary the on, off or intensity level of the light controlled by any one of the plurality of ballasts from almost any location in the area of interest;

means, at least partially provided on said wireless device, for allowing the user to commission each ballast; and means, at least partially provided on said wireless device, for allowing the user to assign a ballast to a group.

2. The system of claim 1 wherein the control system is an automation system and the area of interest comprises at least one structure.

3. The system of claim 1 wherein the wireless device is a laptop.

4. The system of claim 1 wherein the wireless transmissions comprise RF transmissions.

5. The system of claim 1 wherein the addressable lighting system comprises one or more control units.

6. The system of claim 5 wherein the control units communicate with each of the plurality of ballasts via the DALI protocol.

7. The system of claim 5 wherein the control system is connected to each of the one or more control units via a network.

* * * * *